United States Patent
Nishihara et al.

(10) Patent No.: US 11,140,028 B2
(45) Date of Patent: Oct. 5, 2021

(54) COMMUNICATION SYSTEM AND SLICE CONTROL METHOD

(71) Applicant: Nippon Telegraph and Telephone Corporation, Tokyo (JP)

(72) Inventors: Hidetaka Nishihara, Tokyo (JP); Toru Okugawa, Tokyo (JP); Shinya Arita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/975,183

(22) PCT Filed: Feb. 26, 2019

(86) PCT No.: PCT/JP2019/007379
§ 371 (c)(1),
(2) Date: Aug. 24, 2020

(87) PCT Pub. No.: WO2019/167965
PCT Pub. Date: Sep. 6, 2019

(65) Prior Publication Data
US 2021/0119867 A1 Apr. 22, 2021

(30) Foreign Application Priority Data

Feb. 27, 2018 (JP) ............................. JP2018-033480

(51) Int. Cl.
*H04L 12/24* (2006.01)
(52) U.S. Cl.
CPC .......... *H04L 41/0813* (2013.01); *H04L 41/12* (2013.01); *H04L 41/5009* (2013.01)

(58) Field of Classification Search
CPC .. H04L 41/0813; H04L 41/5009; H04L 41/12
See application file for complete search history.

(56) References Cited

U.S. PATENT DOCUMENTS

| 2016/0359682 A1* | 12/2016 | Senarath | H04W 16/14 |
| 2017/0070892 A1* | 3/2017 | Song | H04W 48/20 |
| 2017/0164349 A1* | 6/2017 | Zhu | H04W 28/0247 |

(Continued)

OTHER PUBLICATIONS

[No Author Listed], "3GPP TS 23.501 V1.4.0," 3rd Generation Partnership Project (3GPP™), Sep. 2017, 151 pages.

(Continued)

*Primary Examiner* — Joe Chacko
(74) *Attorney, Agent, or Firm* — Fish & Richardson P.C.

(57) ABSTRACT

There is provided a communication system for controlling a slice including a plurality of subslices. The system includes a temporary configuration unit configured to temporarily configure, for each subslice, a target value related to a service requirement, a measurement unit configured to acquire, in each subslice, a measurement value related to the service requirement for each QoS class and measure a margin, with respect to the target value, of the measurement value, a sharing unit configured to share the margin among the plurality of subslices, and an adjustment unit configured to smooth the margin among the plurality of subslices while satisfying the service requirement for the slice and configure, for each subslice, the target value and the QoS class corresponding to the margin after smoothing.

7 Claims, 20 Drawing Sheets

(56) References Cited

U.S. PATENT DOCUMENTS

2018/0191782 A1* 7/2018 Djordjevic .......... G06F 9/45558
2021/0084525 A1* 3/2021 Takano ................... H04W 4/06

OTHER PUBLICATIONS

[No Author Listed], "3GPP TS 23.502 V1.2.0," 3rd Generation Partnership Project (3GPP™), Sep. 2017, 165 pages.

[No Author Listed], "Service-guaranteed network slicing on 5G white paper," China Mobile Communications Corporation, Jul. 4, 2017, 1:41 pages (with English Translation).

Nakao, "Basic Concept of 5G Mobile Networks," The Fifth Generation Mobile Network Promotion Forum, 2016, 47 pages (with English Translation).

* cited by examiner

| | INFRASTRUCTURE PROVIDER A | BETWEEN PROVIDERS | INFRASTRUCTURE PROVIDER B |
|---|---|---|---|
| SERVICE REQUIREMENT | | DELAY IN E2E IS 50 ms | |
| TARGET VALUE CONFIGURED BY CONTROLLER | 20 ms | 10 ms | 20 ms |
| MEASUREMENT RESOURCE (DELAY AMOUNT AT EACH QoS CLASS) | BE: 50 ms, AF1: 20 ms, AF4: 15 ms, EF: 10 ms | BE: 50 ms, AF1: 20 ms, AF4: 15 ms, EF: 10 ms | BE: 60 ms, AF1: 50 ms, AF4: 30 ms, EF: 25 ms |
| RESOURCE INTERCHANGE AND QoS CLASS CONFIGURATION | TARGET VALUE: CHANGED FROM 20 ms TO 15 ms QoS CLASS: AF4 | TARGET VALUE: 10 ms QoS CLASS: EF | TARGET VALUE: CHANGED FROM 20 ms TO 25 ms QoS CLASS: EF |

Fig. 5

| FUNCTION REQUIREMENT | OVERVIEW |
|---|---|
| SORTING OF CONNECTION SLICES | • SORTING OF VLAN-IF/CHANGING OF VLAN IN SOME UNITS (DESIRED TO SORT BY MINIMUM, srcIP, dstIP, AND VID)<br>• SORTING IN CONSIDERATION OF PRIORITY OF SLICE |
| SECURE BANDWIDTH | BANDWIDTH CONTROL FOR SLICE (POLICING OR SHAVING) |
| DELAY | COLOR RING BASED ON POLICY ON SLICE (DSCP MAPPING) |
| NAT/NAPT | ADDRESS CONVERSION |
| DHCP | DISPENSING OF ADDRESS TO TERMINAL |
| MAC LEARNING | MAC LEARNING OF L2 |
| DYNAMIC ROUTING | CONNECT TO UNDERLAY NETWORK |
| FIB (L2/L3) | STATIC PATH CONFIGURATION (BOTH L2 AND L3) |
| PATH REDUNDANCY | REDUNDANT PATH |
| FILTERING | BLOCKING OF SPECIFIC TRAFFIC |
| TUNNEL FUNCTION | USE FOR PATH CONTROL AND CHAINING WITHIN SLICE |
| CHAINING | ASSOCIATION FUNCTION BETWEEN SERVICE FUNCTIONS |
| AUTHENTICATION | AUTHENTICATION FUNCTION WHEN CONNECTING TO SLICES |
| TELEMETRY COLLECTION | MEASURE AND REPORT FLOW RATE IN EACH SLICE |
| COMMUNICATIONS CONFIRMATION FUNCTION | COMMUNICATIONS CONFIRMATION (EOAM, BFD, OR ICMP) WITH SSF ON OPPOSING SLICES |
| SCALING | SCALING WITH EMPHASIZED EXTENSION OF VL |
| HEALING | AUTOMATIC RECOVERY ASSOCIATED WITH CONTROLLER AT FAILURE |

Fig. 6

| | ACCESS SUBSLICE #1 | BETWEEN ACCESS SUBSLICE AND CORE SUBSLICE | CORE SUBSLICE #1 | BETWEEN PROVIDERS |
|---|---|---|---|---|
| TEMPORARILY CONFIGURED TARGET VALUE (UNIT ms) | 10 | 5 | 5 | 5 |

Fig. 10

| SERVICE REQUIREMENT (UNIT ms) | CORE SUBSLICE #1 TARGET VALUE (UNIT ms) | MEASUREMENT RESULT (MARGIN FROM SUBSLICE TARGET VALUE) (UNIT ms) | | | |
|---|---|---|---|---|---|
| | | QoS: BE | QoS: AF1 | QoS: AF4 | QoS: EF |
| 50 | 10 | 30 (+20) | 10 (+0) | 5 (-5) | 3 (-7) |

Fig. 12

| INFRASTRUCTURE PROVIDER INFORMATION | SUBSLICE INFORMATION | SUBSLICE TARGET VALUE (UNIT ms) | CONFIGURE QoS CLASS |
|---|---|---|---|
| PROVIDER A | CORE SUBSLICE #1 | 5 | EF |

Fig. 16

COMMUNICATION SYSTEM AND SLICE CONTROL METHOD

CROSS-REFERENCE TO RELATED APPLICATIONS

This application is a National Stage application under 35 U.S.C. § 371 of International Application No. PCT/JP2019/007379, having an International Filing Date of Feb. 26, 2019, which claims priority to Japanese Application Serial No. 2018-033480, filed on Feb. 27, 2018. The disclosure of the prior application is considered part of the disclosure of this application, and is incorporated in its entirety into this application

TECHNICAL FIELD

The present disclosure relates to a technology for satisfying service requirements in network slices.

BACKGROUND ART

In recent years, network slice technologies that virtually construct networks for service requirements on a common network platform have been studied (for example, Non-Patent Literatures 1 and 2). FIG. 1 is a diagram illustrating an example of a configuration of End-to-End (E2E) slices. An E2E slice #1 and an E2E slice #2 are illustrated in FIG. 1, and each E2E slice includes a plurality of subslices (an access subslice and a core subslice in the example of FIG. 1).

The concept of the network slice is often common to Network Function Virtualization (NFV), and a slice architecture has been studied based on an NFV reference architecture.

In a network slice, a constant service level needs to be satisfied for a provider side to be used as a virtual network for service requirements. Here, in one example, a delay is used as one of the service requirements. This delay needs to satisfy transfer within a constant delay time by adding delays in all elements constituting the slice. For example, as illustrated in FIG. 2, when there is a slice in which a plurality of subslices (sub-networks) are connected in series, the delay needs to satisfy the service requirement after delay times are added.

In the related art, the requirement can be satisfied by configuring a target value (for example, a delay of 20 ms in the subslice #1) for each subslice to satisfy the service requirement (for example, 50 ms in E2E) of the E2E and configuring an appropriate Quality of Service (QoS) from a controller of the slice (for example, configuring a QoS class (priority transfer) which satisfies the service requirement). In the related art, E2E slices within the same infrastructure provider are used (Non-Patent Literatures 3 and 4).

CITATION LIST

Non Patent Literature

Non-Patent Literature 1: http://www.huawei.com/minisite/5g/img/5G_Service-_Guaranteed_Network_Slicing_jp.pdf, Searched on Feb. 19, 2018
Non-Patent Literature 2: http://www.soumu.go.jp/main-_content-000457253.pdf, Searched on Feb. 19, 2018
Non-Patent Literature 3: 3GPP TS 23.501 V1.4.0 (2017-09)
Non-Patent Literature 4: 3GPP TS 23.502 V1.2.0 (2017-09)

SUMMARY OF THE INVENTION

Technical Problem

A combination of various infrastructures has also been proposed as the network slice. For example, as illustrated in FIG. 3, when E2E slices are provided by a plurality of infrastructure providers (infrastructure provider A and infrastructure provider B), since a controller of each infrastructure provider is closed by each provider, it is unclear what configuration to perform for each subslice to satisfy the requirement for the slice. In this case, the related art described above cannot be applied.

Here, it is possible to distribute the target value in some manner (for example, an equal distribution manner) for the plurality of subslices constituting the slice. However, there is a problem in that for such cases where the target is not achieved only in a specific subslice and the overall slice is not satisfied, or where a very high QoS class is required only in the specific subslice, resources cannot be efficiently used.

The present disclosure has been made in view of such circumstances, and an object of the present disclosure is to provide a technology capable of efficiently using resources while satisfying a service requirement in an E2E slice including a plurality of subslices.

Means for Solving the Problem

The present disclosure provides a communication system for controlling a slice including a plurality of subslices. The system includes a temporary configuration unit configured to temporarily configure, for each subslice, a target value related to a service requirement, a measurement unit configured to acquire, in each subslice, a measurement value related to the service requirement for each QoS class and measure a margin, with respect to the target value, of the measurement value, a sharing unit configured to share the margin among the plurality of subslices, and an adjustment unit configured to smooth the margin among the plurality of subslices while satisfying the service requirement for the slice and configure, for each subslice, the target value and the QoS class corresponding to the margin after smoothing.

Effects of the Invention

In accordance with the disclosed technology, there is provided a technology capable of efficiently using resources while satisfying a service requirement in an E2E slice including a plurality of subslices.

BRIEF DESCRIPTION OF DRAWINGS

FIG. 5 is a diagram for describing an overview of the embodiment.
FIG. 6 is a diagram illustrating functions of an SLG.

FIG. 10 is a diagram illustrating an example of a table retained by a controller.

FIG. 12 is a diagram showing an example of a table 1 retained by a determination unit.

FIG. 16 is a diagram showing a table 3 retained by a control unit.

DESCRIPTION OF EMBODIMENTS

Hereinafter, an embodiment of the present disclosure (the present embodiment) will be described with reference to the drawings. An embodiment to be described below is merely an example, and an embodiment to which the present disclosure is applied is not limited to the following embodiment.

Although a delay will be described as one of service requirements in the following embodiment, the delay is an example, and the present disclosure is applicable without being limited to a case where the service requirement is the delay. Although E2E slices provided by the infrastructures of a plurality of providers are used in the present embodiment, the present disclosure is also applicable to E2E slices provided by the infrastructure of a single provider.

Overview of Embodiment

Figure 1:
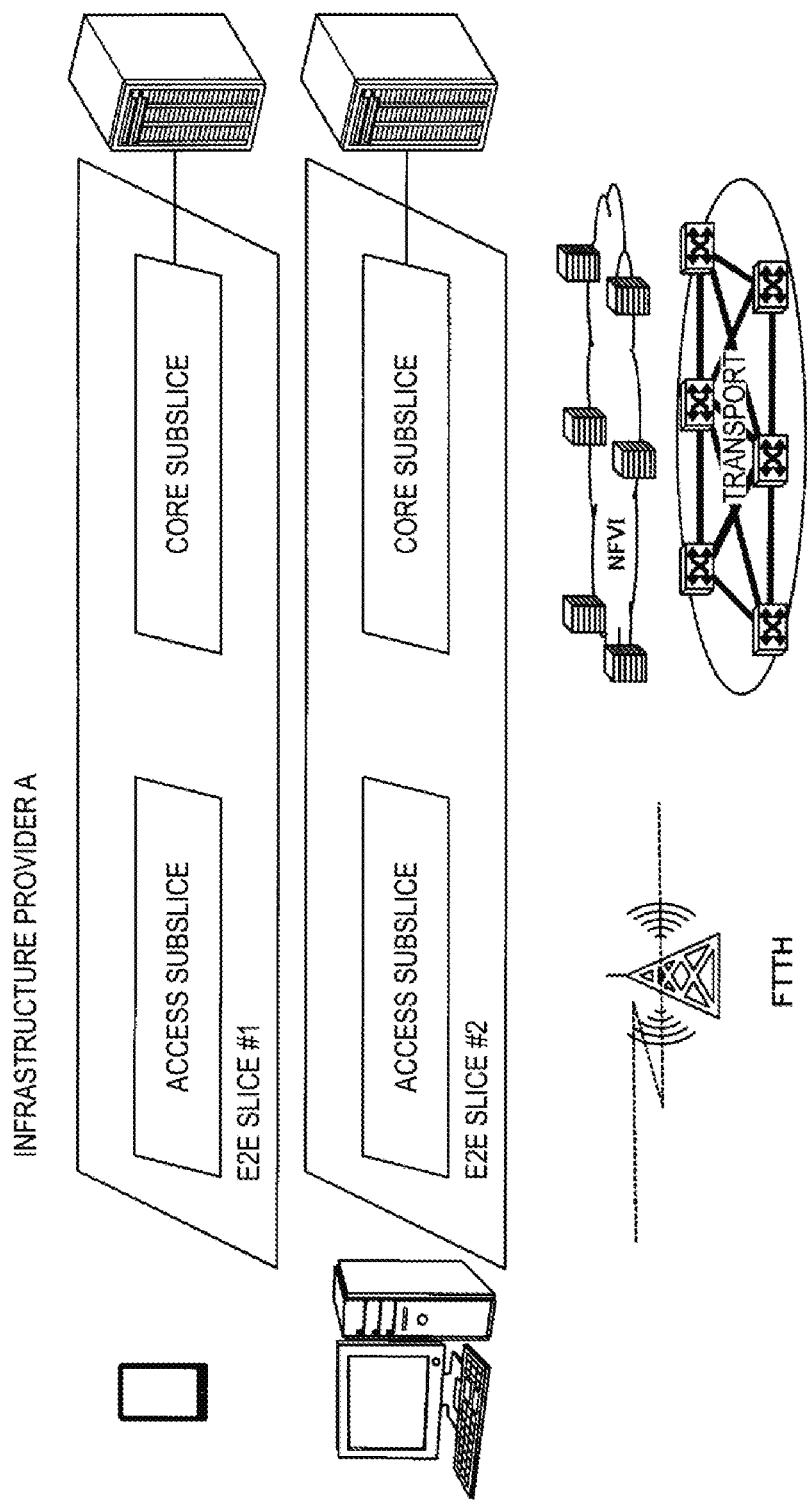
FIG. 1 is a diagram for describing E2E slices.
Figure 2:
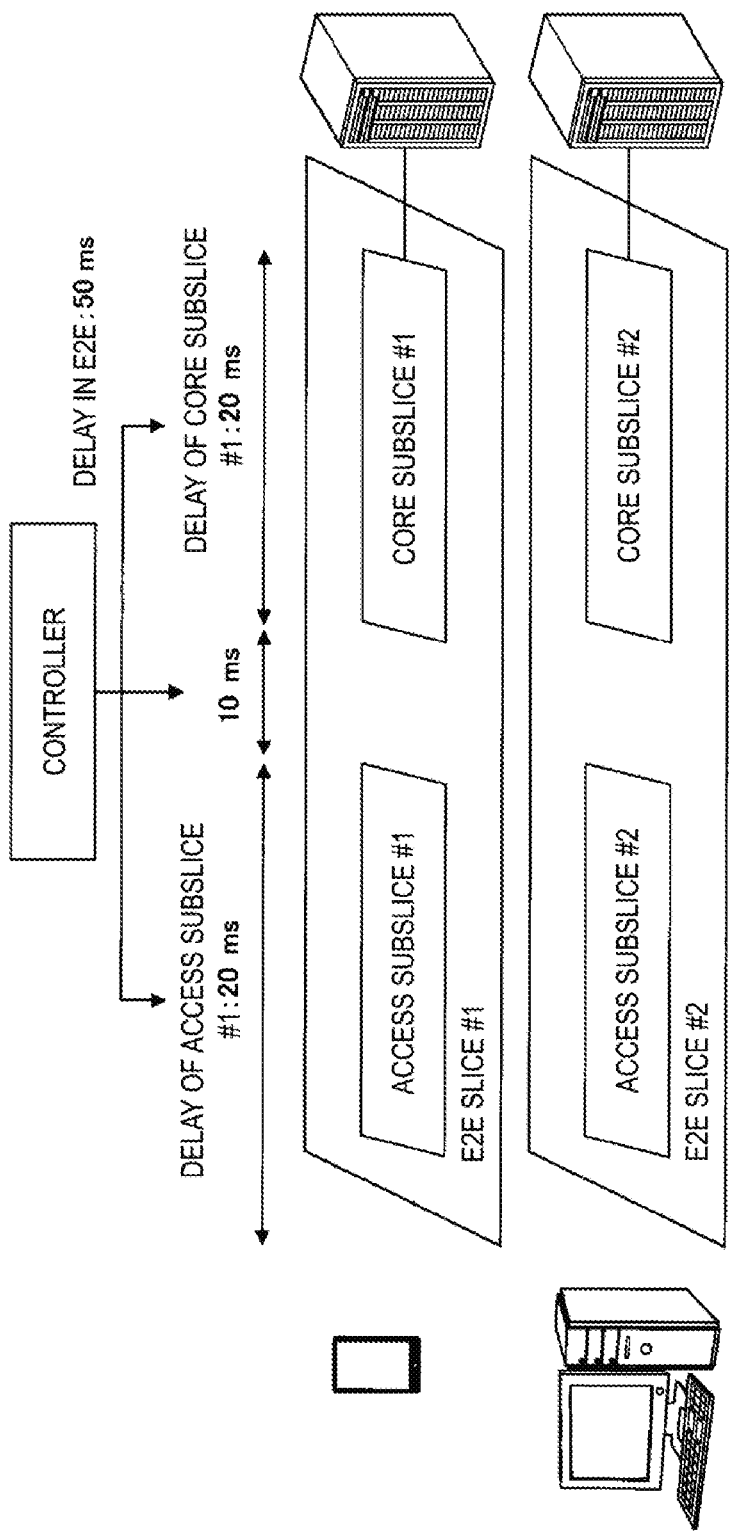
FIG. 2 is a diagram for describing requirements required for the slices.
Figure 3:
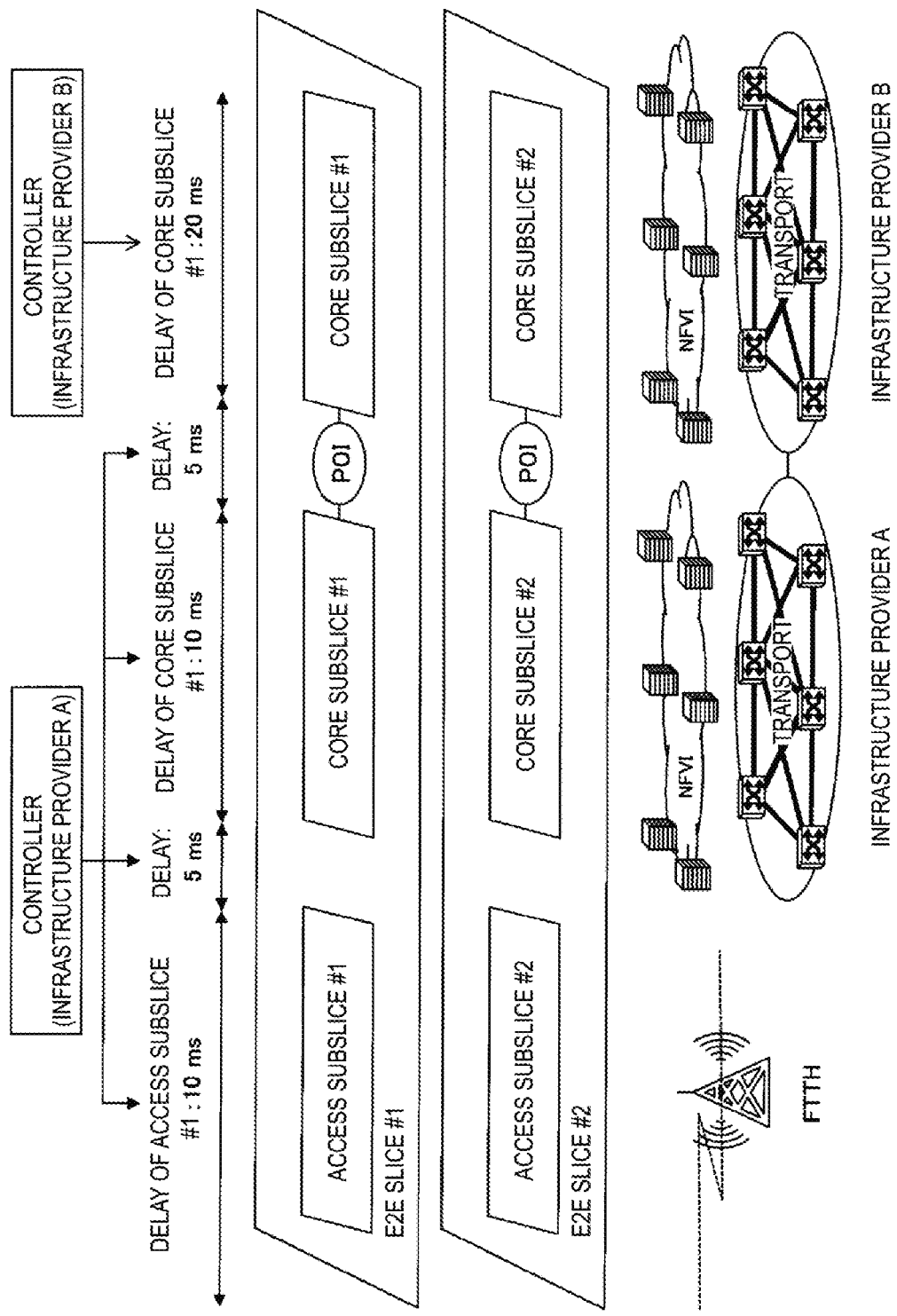
FIG. 3 is a diagram for describing problems.
Figure 4:
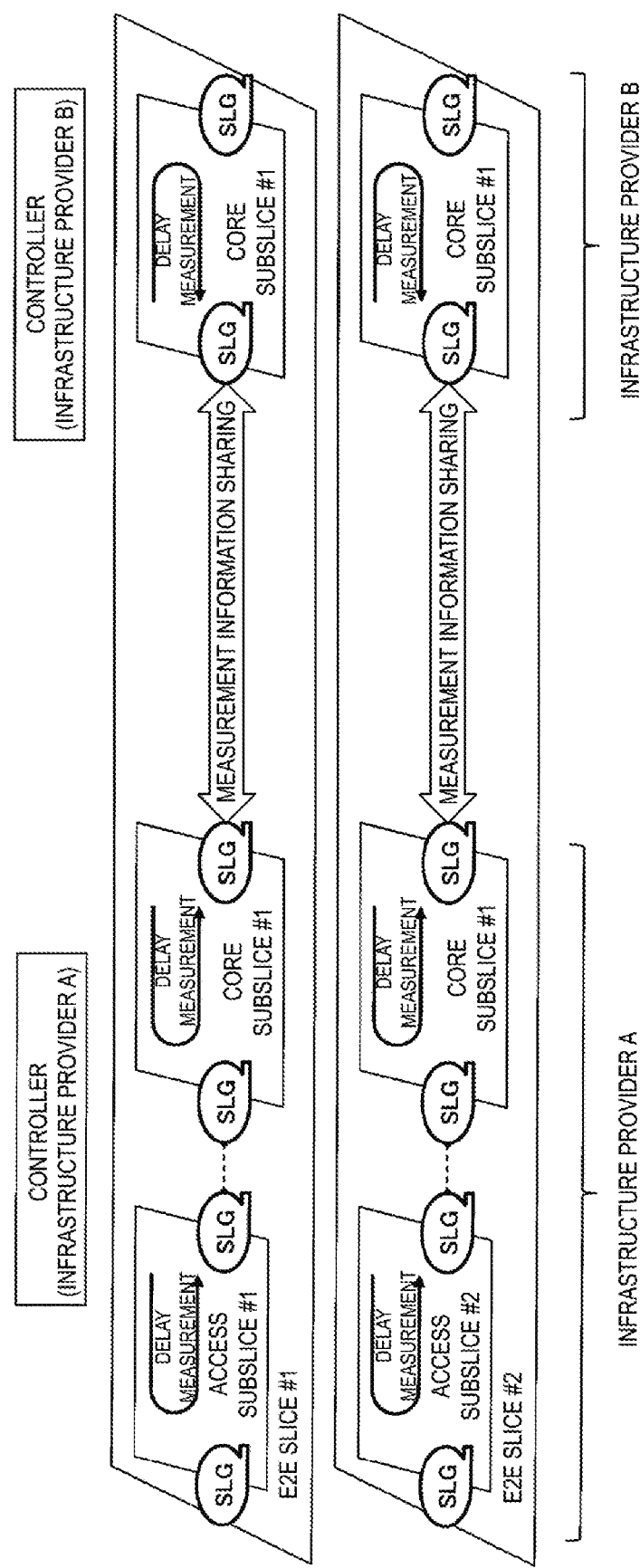
FIG. 4 is a diagram for describing an overview of an embodiment.

An overview of the embodiment will be described with reference to FIG. 4. The example illustrated in FIG. 4 is an example in which E2E slices are provided by the infrastructure of an infrastructure provider A and the infrastructure of an infrastructure provider B. As illustrated in FIG. 4, in the present embodiment, characteristic values for various configuration values are initially measured within each infrastructure provider and the measured values are shared between the providers to satisfy a service requirement (for example, a delay of 50 ms) in E2E.

Subsequently, the service requirement in the E2E is efficiently satisfied by smoothing margins from target performance (delay time) in the E2E slice based on the shared information and adjusting target values to satisfy the requirement in a condition in which a QoS class is set as low as possible (at low cost).

The characteristic value is continuously measured and the measured value is changed from the initially measured value due to a situation change during communications. In this case, the requirement is satisfied while following the situation change by changing the distribution of the target values.

FIG. 5 illustrates an example of the aforementioned control contents. As illustrated in FIG. 5, in this example, a target value of a subslice in the infrastructure provider A is changed from 20 ms to 15 ms, and a target value of a subslice in the infrastructure provider B is changed from 20 ms to 25 ms. In this case, in the infrastructure provider A, although the QoS class may be configured to EF, the QoS class is configured to AF4 to configure the QoS class to be as low as possible (at low cost).

In the present embodiment, as illustrated in FIG. 4, slice gateways (SLG) having a function of performing delay measurement and QoS configuration of each subslice segment and a function of sharing information are installed at both ends of each subslice to realize the aforementioned processing. When a centralized control method to be described below is employed, the SLG side may not have the information sharing function.

Each SLG has functions illustrated in more detail in FIG. 6. As illustrated in FIG. 6, each SLG has a function of securing a bandwidth and a function of ensuring a delay in units of slices to satisfy the service requirement of the slice. The functions illustrated in FIG. 6 are examples, and the SLG according to the present embodiment may not have all of the functions illustrated in FIG. 6. The SLG according to the present embodiment may have functions not illustrated in FIG. 6.

Examples of Control Method

Examples of the method of realizing the aforementioned control include a distributed control method and a centralized control method.

Distributed Control Method

Figure 7:
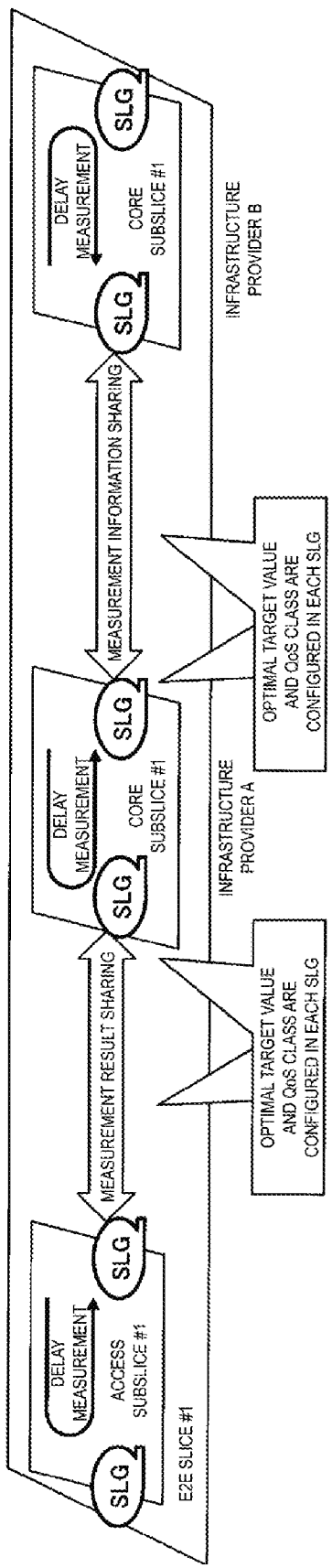
FIG. 7 is a diagram for describing a distributed control method.

As illustrated in FIG. 7, in the distributed control method, optimal target values and QoS classes are configured by sharing results measured in the subslices between the SLGs and interchanging the margins with respect to the target values between the subslices without using a controller. In the distributed control method, processing is executed in the following procedure.

S11) The controller temporarily configures the target value in each subslice.

S12) The delay measurement (the measurement of the margin with respect to the target value) is executed between the SLGs of each subslice.

S13) The measured margin is shared between the SLGs.

S14) Whether the margin is interchangeable between the subslices is negotiated between the SLGs based on the shared result.

S15) The target value configured from the controller is reconfigured based on the negotiated result, and the reconfigured value is notified to the controller.

S16) The QoS class of each subslice is configured and controlled in the SLG based on the negotiated result.

S17) The SLG periodically measures the delay, and monitors whether the measured delay deviates from the reconfigured target value.

In S17, when a deviation from the reconfigured target value occurs, S12 to S17 are executed again.

Centralized Control Method

Figure 8:
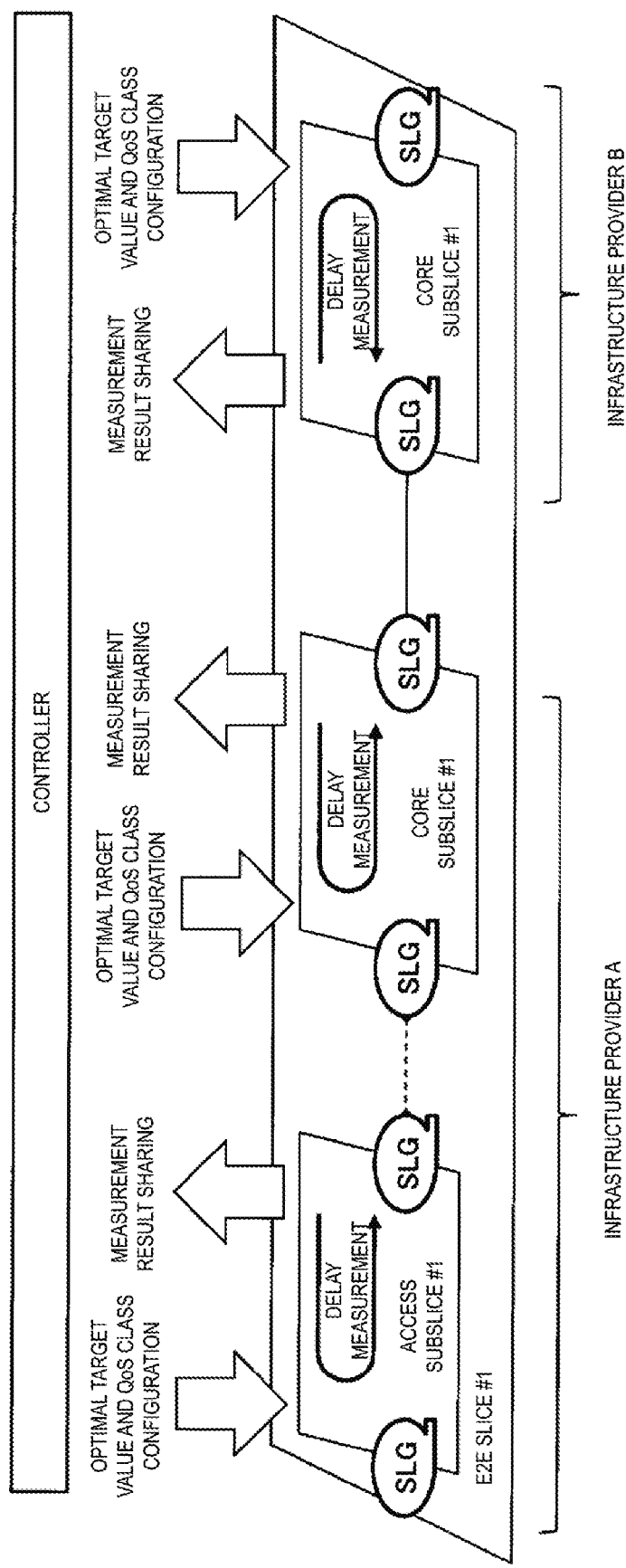
FIG. 8 is a diagram for describing a centralized control method.

As illustrated in FIG. 8, in the centralized control method, the results measured in the subslices are shared with the controller, and the controller ascertains the margins, with respect to the target values, of the subslices, and then configures the optimal target values and QoS classes. In the centralized control method, processing is executed in the following procedure.

S21) The controller temporarily configures the target value in each subslice.

S22) The delay measurement (the measurement of the margin with respect to the target value) is executed between the SLGs of each subslice.

S23) The measured result and the margin with respect to the target value are shared with the controller.

S24) The controller reconfigures the target value configured in S21 based on the shared result.

S25) The controller configures the QoS class for the SLGs of each subslice based on the shared result.

S26) The SLG periodically measures the delay, and notifies the controller of the measured delay.

S27) The measurement result in the SLG is observed and whether the observed measurement result deviates from the reconfigured target value is monitored in the controller.

In S27, when the deviation from the reconfigured target value occurs. S22 to S27 are executed again.

Hereinafter, a more specific detailed example of the distributed control method will be described.

Detailed Example

Figure 9:
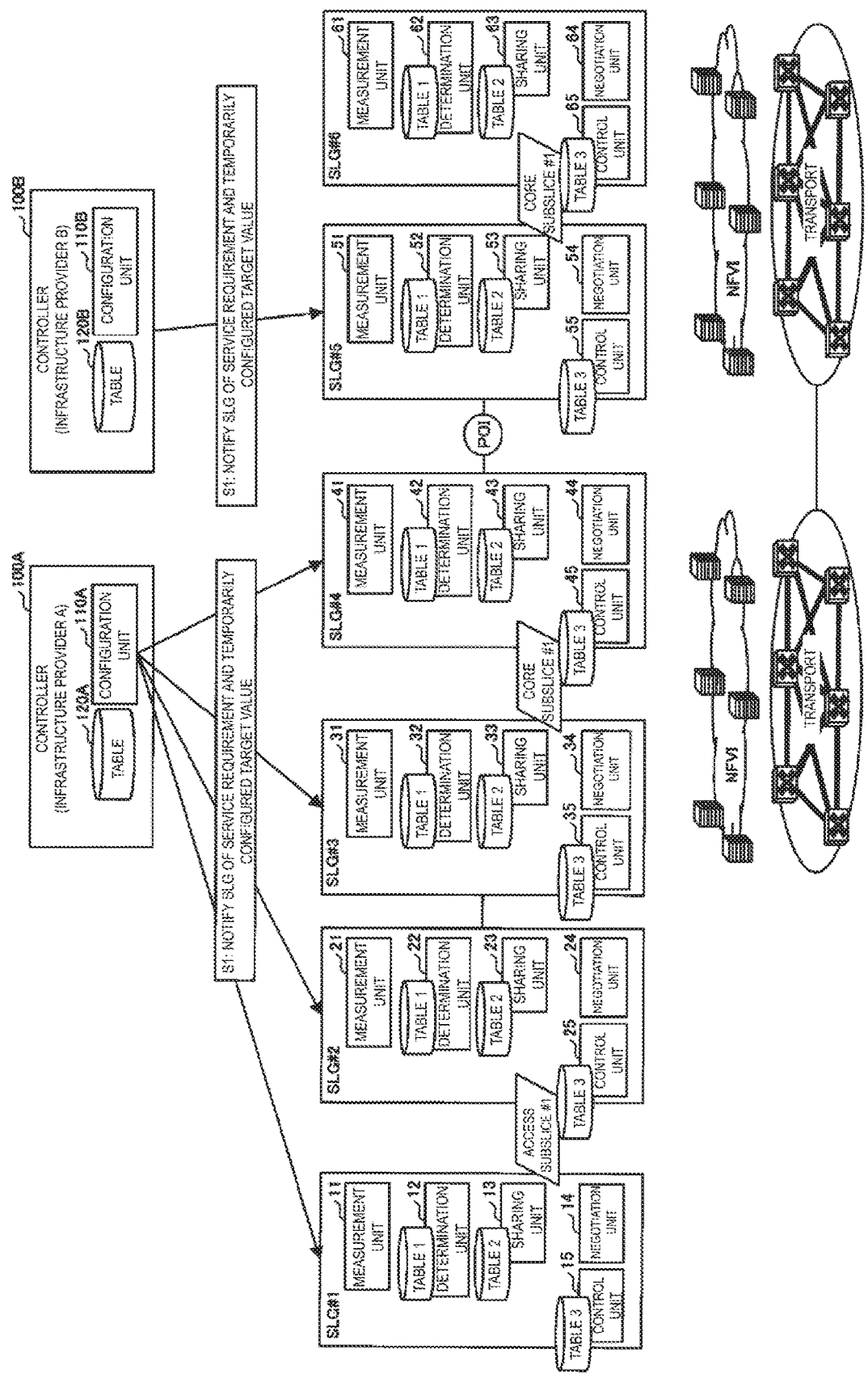
FIG. 9 is an overall configuration diagram of a communication system.

FIG. 9 is a diagram more specifically illustrating a configuration of each SLG in the E2E slices provided by the infrastructure of the infrastructure provider A and the infrastructure of the infrastructure provider B. As illustrated in FIG. 9, the SLG #1 includes a measurement unit 11, a determination unit 12, a sharing unit 13, a negotiation unit 14, and a control unit 15. Other SLGs #2 to #6 also include similar functional units. Hereinafter, when the functional units are described without particularly distinguishing between the SLGs, these functional units are referred to as a measurement unit N1, a determination unit N2, a sharing unit N3, a negotiation unit N4, and a control unit N5 (N is a number of the SLG).

The measurement unit N1 measures the delay between the SLGs of each subslice. The determination unit N2 includes a table 1 (to be described below), and determines whether the target value is achieved by the delay. The sharing unit N3 includes a table 2 (to be described below), and shares provider information, subslice information, the target value, and the margin with the other SLGs. The negotiation unit N4 negotiates whether the margin of each subslice is interchangeable with the other SLGs, and notifies the control unit N4 of a QoS class obtained by the negotiation. The control unit N5 includes a table 3 (to be described below), configures a QoS class based on the QoS class notified from the negotiation unit N4, and performs control based on the QoS class.

As illustrated in FIG. 9, a controller 100A of the infrastructure provider A and a controller 100B of the infrastructure provider B are provided. The controller 100A includes a configuration unit 110A and a table 120A. Similarly, the controller 100B includes a configuration unit 110B and a table 120B. Hereinafter, when the functional units are described without particularly distinguishing between the infrastructure providers, these functional units are referred to as a controller 100, a configuration unit 110, and a table 120. Hereinafter, a processing procedure example based on the configuration illustrated in FIG. 9 will be described.

First, each controller 100 temporarily configures a target value (a target value of a delay) of each subslice in the table 120. FIG. 10 is a diagram illustrating an example of information configured in the table 120. In one example, in FIG. 10, a target value of an access subslice #1 is 10 ms, a target value between an access subslice and a core subslice is 5 ms, a target value of a core subslice #1 is 5 ms, and a target value between the providers is 5 ms.

As illustrated in FIG. 9, in SL the configuration unit 110 of each controller 100 notifies the subordinate SLGs of the service requirements and the temporarily configured target values.

Figure 11:
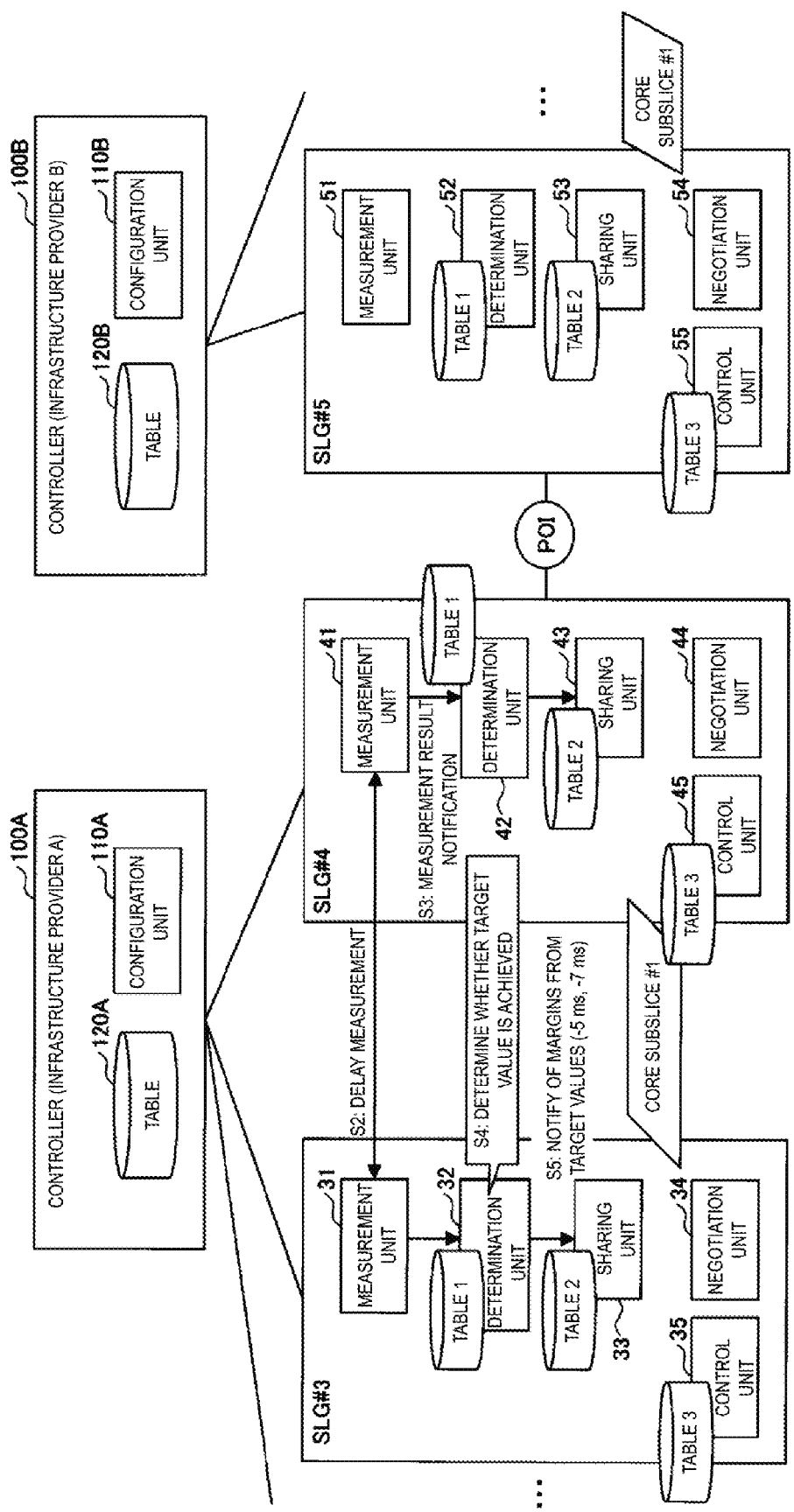
FIG. 11 is a diagram for describing operation of the communication system.

As illustrated in FIG. 11, in S2, in each subslice, the delay measurement is performed by the measurement unit N1, and the margin from the target value is measured. For example, the delay measurement between the measurement unit 31 and the measurement unit 41 is illustrated in FIG. 11. In S3, the measurement unit N1 notifies the determination unit N2 of the measurement result. The determination unit N2 records the measurement result together with the service requirement and the subslice target value in the table 1.

For example, FIG. 12 shows an example of the table 1 referred to by the determination unit 32 (or the determination unit 42) in FIG. 11. In the example shown in FIG. 12, for example, the measurement result when the QoS is BE is 30 ms, and the margin from the target value of 10 ms is +20 ms. For example, the measurement result when the QoS is AF4 is 5 ms, and the margin from the target value of 10 ms is −5 ms.

In S4 of FIG. 11, the determination unit N2 determines whether the target value is achieved by the measurement result, and in S5 notifies the sharing unit N3 of the margin. In the example of FIG. 11, the determination unit 32 notifies the sharing unit 33 (the same applies to the notification from the determination unit 42 to the sharing unit 43) of the margins (−5 ms and −7 ms) from the target values based on the measurement results shown in FIG. 12.

Figure 13:
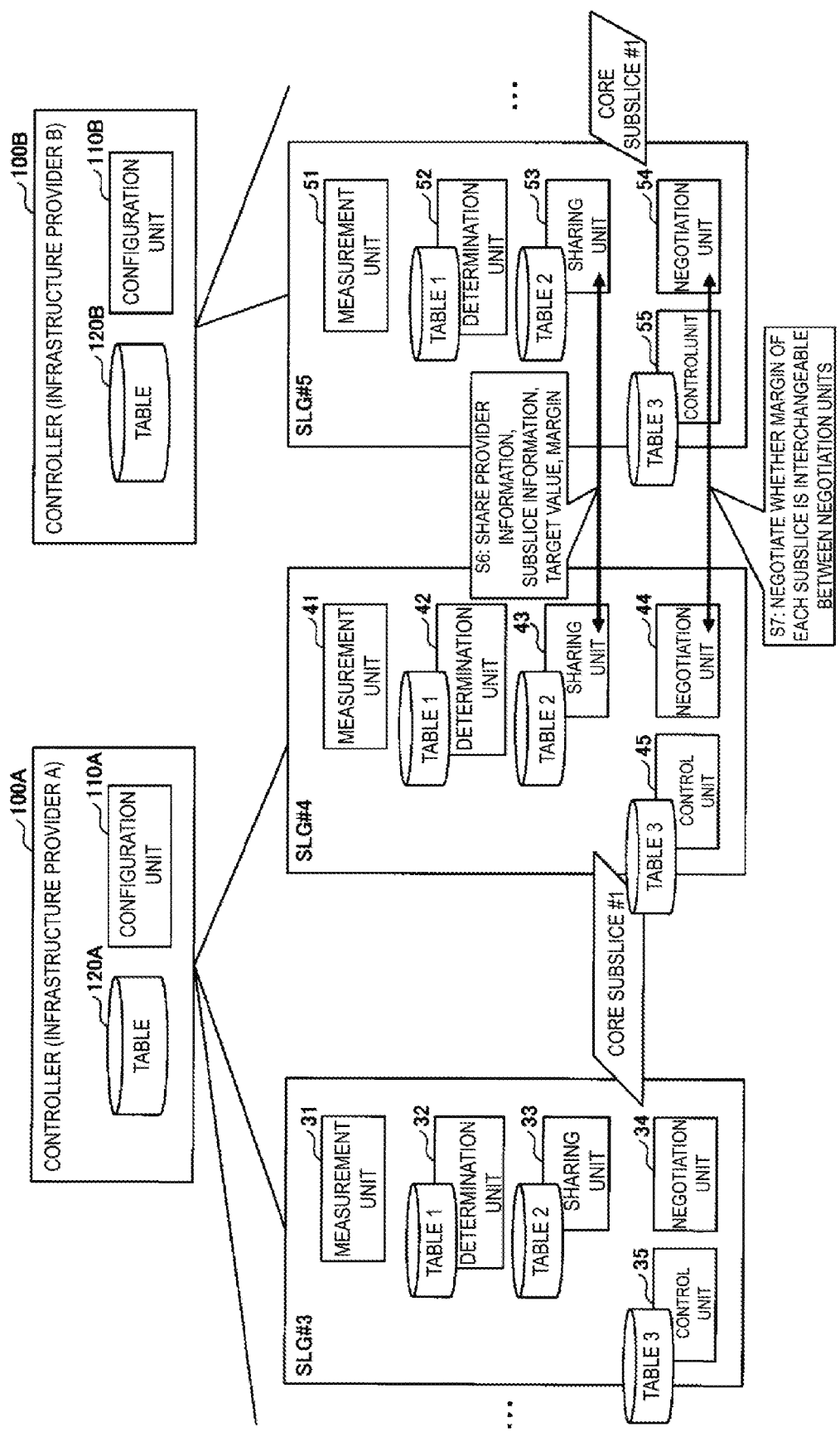
FIG. 13 is a diagram for describing the operation of the communication system.

Subsequently, as illustrated in FIG. 13, in S6, the sharing units N3 share the provider information, the subslice information, the target values, and the margins between the subslices. For example, the information is shared between the SLG #4 of the core subslice #1 of the infrastructure provider A and the SLG #5 of the core subslice #1 of the infrastructure provider B in FIG. 13.

Figure 14:
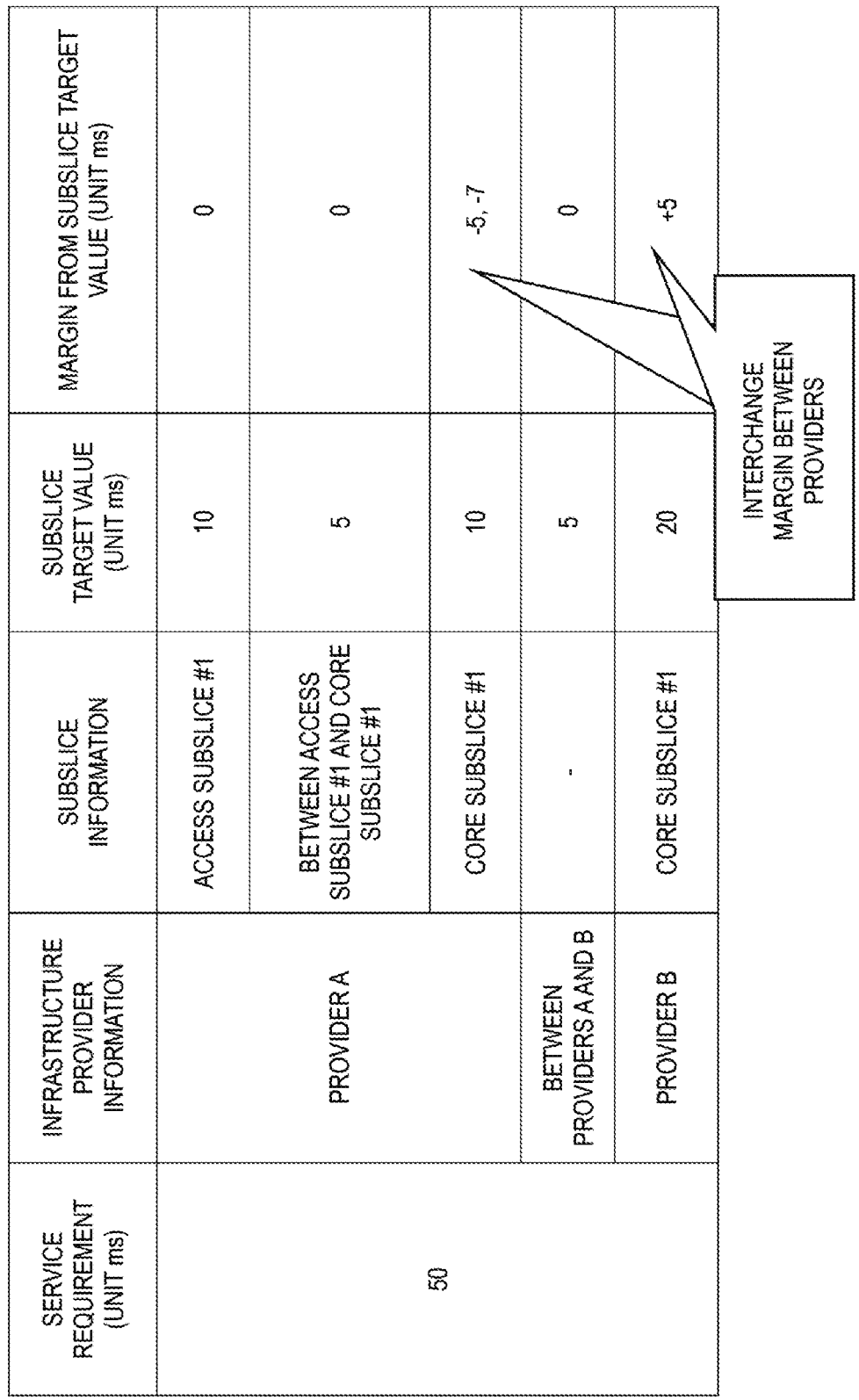
FIG. 14 is a diagram showing a table 2 retained by a sharing unit.

An example of the table 2 retained by the sharing unit 43 (the same applies to the sharing unit 53) in this case is shown in FIG. 14. As shown in FIG. 14, the margins from the subslice target value of the core subslice #1 of the provider A are −5 and −7, and the margin of the core subslice #1 of the provider B is +5. In S7 of FIG. 13, whether the margin of each subslice is interchangeable is negotiated between the negotiation units N4 of the plurality of subslices. In the example shown in FIG. 14, the margin is interchanged between the core subslice #1 (margin: −5) of the provider A and the core subslice #1 (margin: +5) of the provider B. The details of the negotiation logic will be described below.

Figure 15:
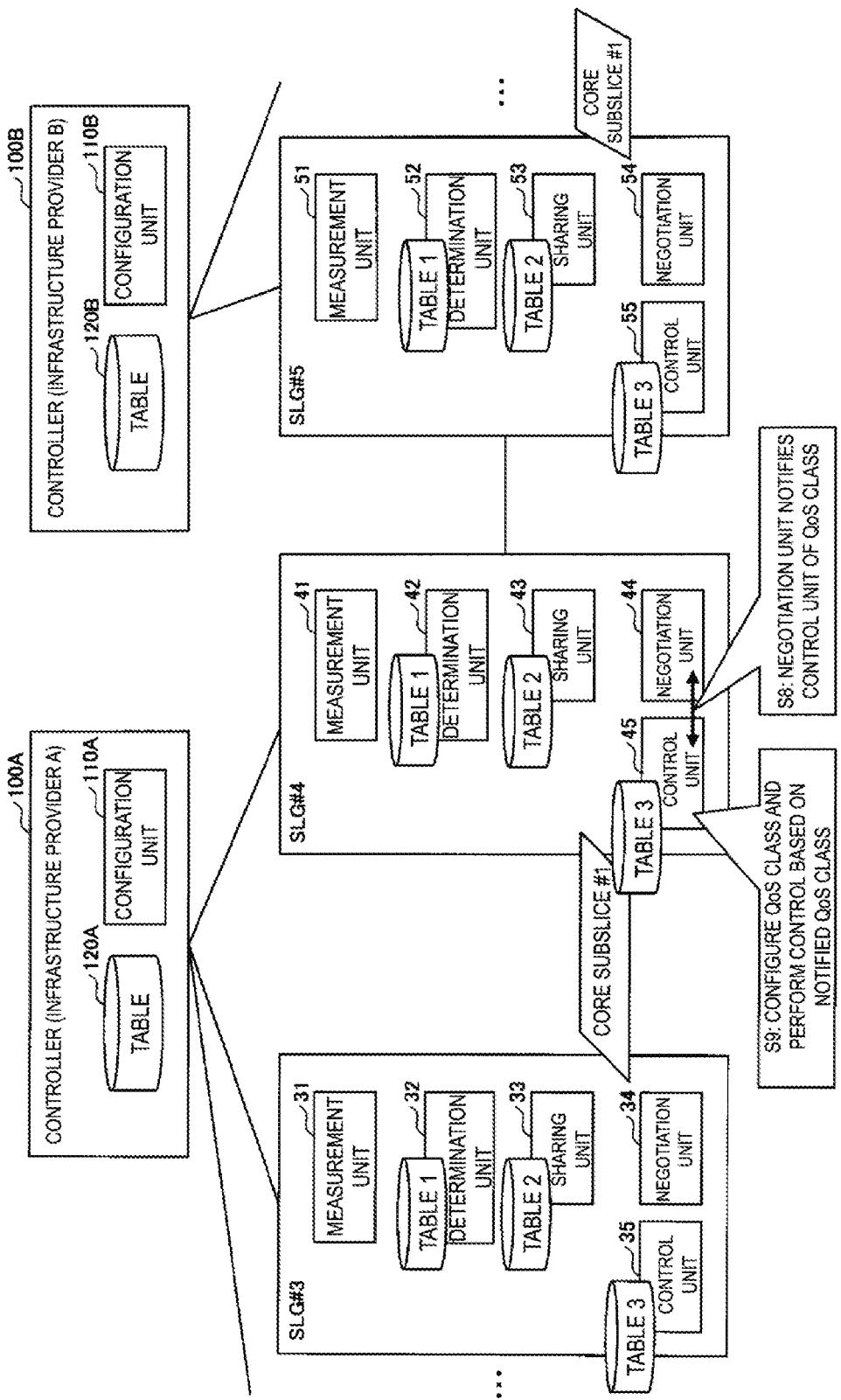
FIG. 15 is a diagram for describing the operation of the communication system.

Subsequently, as illustrated in S8 of FIG. 15, the negotiation unit N4 notifies the control unit N5 of the target value and the QoS class decided by the negotiation. In S9, the control unit N5 records the notified information in the table 3, and configures the notified QoS class and performs control based on the QoS class. The reconfigured target value is notified to the controller 100. FIG. 16 shows an example of the table 3 retained by the control unit 43. In this case, in the core subslice #1 of the provider A. EF is used as the QoS class, and 5 ms is used as the subslice target value (10 ms at the time of the temporary configuration) by the negotiation.

Figure 17:
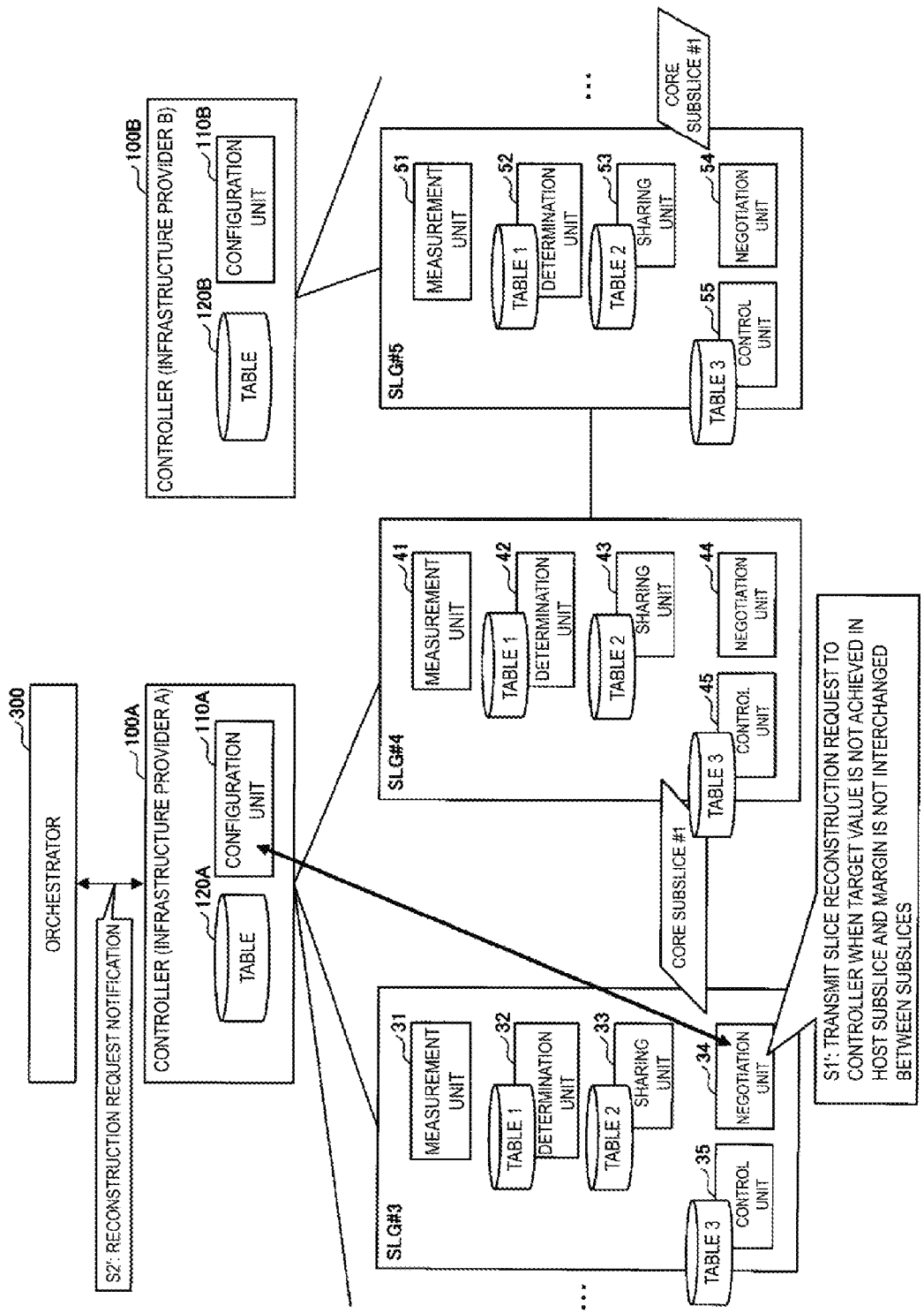
FIG. 17 is a diagram for describing the operation of the communication system.

FIG. 17 illustrates an example in which the margin is not interchangeable. As illustrated in S1' of FIG. 17, when the target value is not achieved in the host subslice and the margin is not interchanged between the subslices, the negotiation unit N4 transmits a slice reconstruction request to the controller 100. Accordingly, the reconstruction request is notified to an orchestrator 300 from the controller 100 in S2', and then reconstruction processing is performed by the orchestrator 300.

Logic in which Margin is Interchanged by Negotiation Unit N4

Figure 18:
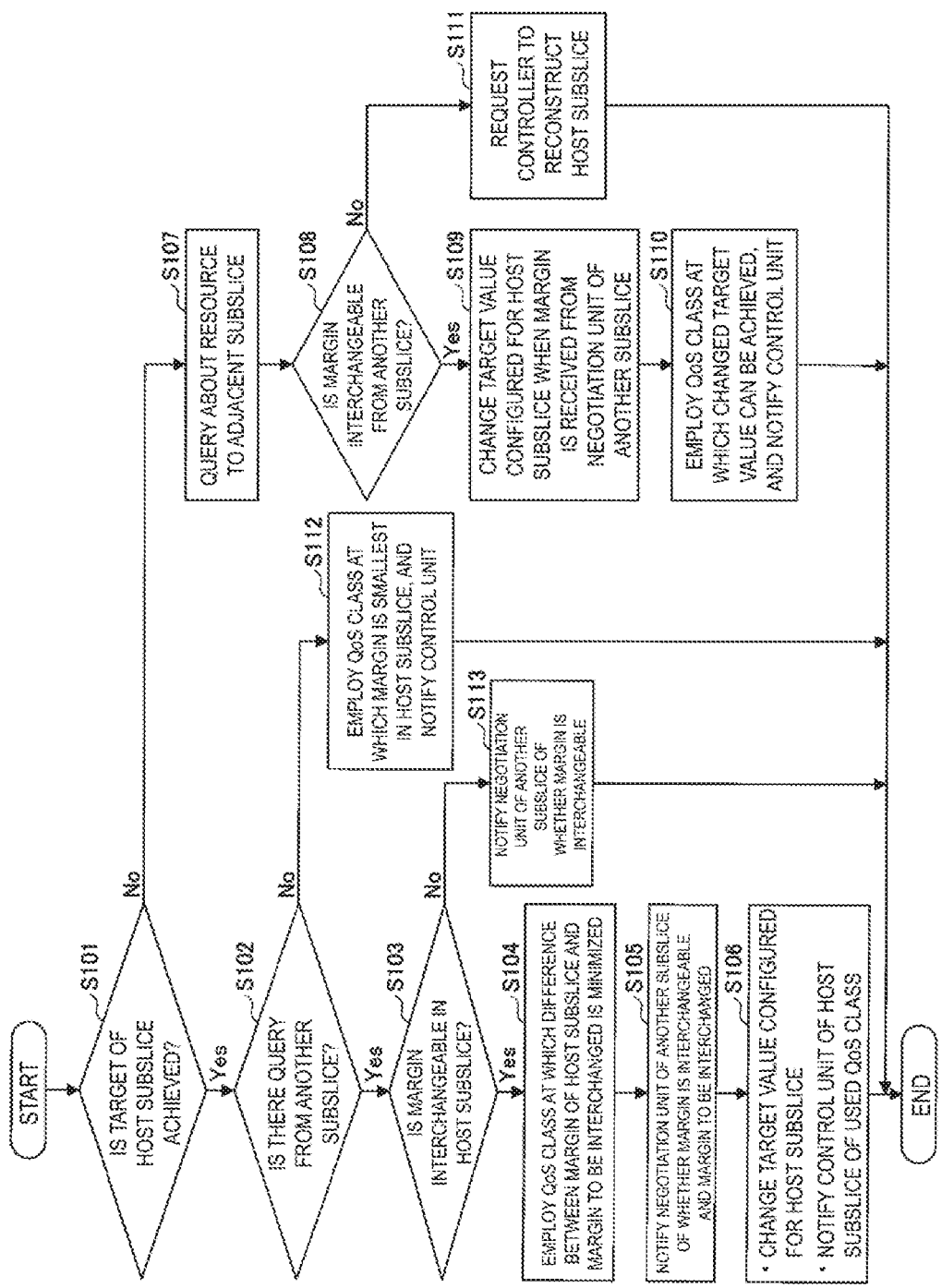
FIG. 18 is a diagram for describing a logic in which a margin in a negotiation unit is interchanged.

A logic (processing procedure) in which the margin is interchanged by the negotiation unit N4 will be described with reference to a flowchart of FIG. 18.

In S101, the negotiation unit N4 determines whether the target of the host subslice is achieved. When the determination result in S101 is Yes, the processing proceeds to S102. In S102, the negotiation unit N4 determines whether there is a query from another subslice. When the determination result in S102 is Yes (the query exists), the processing proceeds to S103. In S103, the negotiation unit N4 determines whether the margin is interchangeable in the host subslice. When the determination result in S103 is Yes (interchangeable), the processing proceeds to S104.

In S104, the negotiation unit N4 employs the QoS class at which a difference between the margin of the host subslice and the margin to be interchanged is minimized. For example, when the interchangeable margin of the host subslice is 5 (that is, −5) at AF4 and is 7 (that is, −7) at EF, in a case where the margin to be interchanged is 5, 5 at AF4 at which the difference is minimized is decided as the margin to be interchanged by the host subslice.

Subsequently, in S105, the negotiation unit N4 notifies the negotiation unit of another subslice of whether the margin is interchangeable (interchangeable) and the margin to be interchanged. In S106, the negotiation unit N4 changes the target value configured for the host subslice, and notifies the control unit N5 of the host subslice of the used QoS class.

When the determination result of S101 is No (when the target is not achieved in the host subslice), the processing proceeds to S107. In S107, the negotiation unit N4 queries about whether the margin is interchangeable to an adjacent subslice. Subsequently, in S108, the negotiation unit N4 determines whether the margin is interchangeable from another subslice. When the determination result is Yes, the processing proceeds to S109.

In S109, when the margin to be interchanged is received from the negotiation unit of another subslice, the negotiation unit N4 changes the target value configured for the host subslice. In S110, the negotiation unit N4 employs the QoS class at which the changed target value can be achieved, and notifies the control unit N5 of the employed QoS class.

When the determination result of S108 is No (when the margin is not interchangeable from another subslice), the processing proceeds to S111. In S111, the negotiation unit N4 requests the controller 100 to reconstruct the host subslice.

When the determination result of S102 is No (when there is no query from another subslice), the processing proceeds to S112. In S112, the negotiation unit N4 employs the QoS class at which the margin is the smallest, among the QoS classes at which the target is achieved, in the host subslice, and notifies the control unit N5 of the employed QoS class.

When the determination result of S103 is No (when the margin is not interchangeable in the host subslice), the processing proceeds to S113. In S113, whether the margin is interchangeable (in this case, uninterchangeable) is notified to the negotiation unit of another subslice.

The distributed control method has been described as the detailed example. The processing contents in the centralized control method are similar to the processing contents in the distributed control method except that the information shared between the subslices in the distributed control method is retained by the controller 100 and interchange processing between the negotiation units in the distributed control method is performed by the controller 100.

In the case of the centralized control method, each SLG may not include the determination unit N2, the sharing unit N3, and the negotiation unit N4. In the case of the centralized control method, for example, the measurement result in the measurement unit N1 is notified to the controller 100, the information is shared between the controllers 100 of the plurality of providers, and the similar processing to the processing in the determination unit N2, the sharing unit N3, and the negotiation unit N4 in each SLG in the distributed control method is executed in the configuration unit 110 of each controller. The processing results are notified to the control unit N5 of each SLG from the controller 100.

Hardware Configuration Example

Any of the devices such as each SLG and the controller 100 can be realized by, for example, causing a computer to execute a program that describes the processing contents described in the present embodiment.

That is, the device can be realized by executing a program corresponding to processing performed in the device by using hardware resources such as a CPU and a memory built in the computer. The program can be recorded, stored, or distributed on a computer readable recording medium (such as a portable memory). It is also possible to provide the program through a network such as the Internet or an email.

Figure 19:
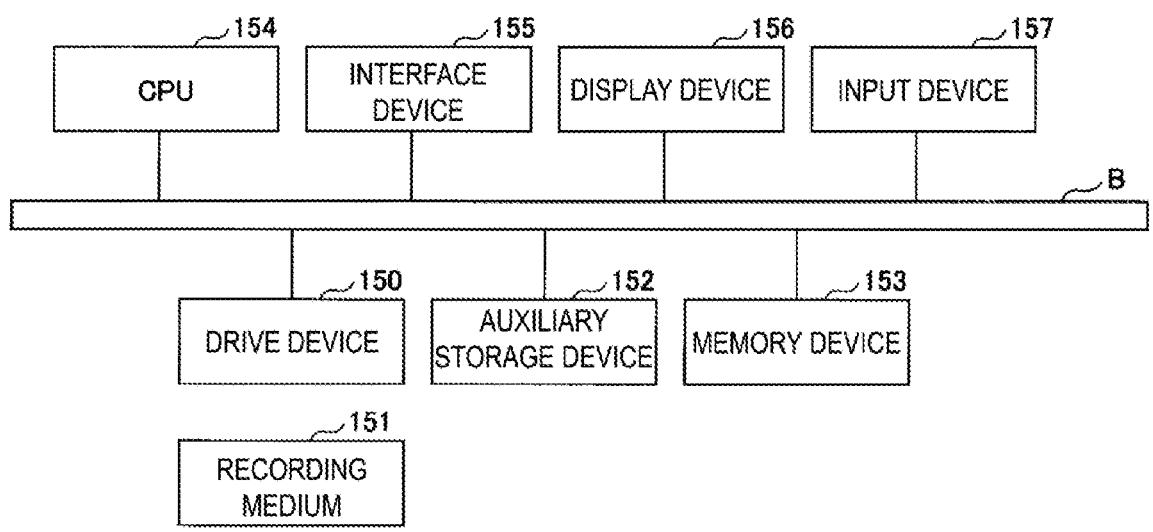
FIG. 19 is a diagram illustrating a hardware configuration example of a device.

FIG. 19 is a diagram illustrating a hardware configuration example of the computer according to the present embodiment. The computer of FIG. 19 includes a drive device 150, an auxiliary storage device 152, a memory device 153, a CPU 154, an interface device 155, a display device 156, and an input device 157 which are connected to one another through a bus B.

The program for realizing the processing in the computer is provided by, for example, a recording medium 151 such as a CD-ROM or a memory card. When the recording medium 151 that stores the program is set in the drive device 150, the program is installed on the auxiliary storage device 152 from the recording medium 151 via the drive device 150. However, the program may not be installed from the recording medium 151, and may be downloaded from another computer via the network. The auxiliary storage device 152 stores an installed program, and stores required files and data.

When there is an instruction to activate the program, the memory device 153 reads and stores the program from the auxiliary storage device 152. The CPU 154 realizes a function related to a control node according to the program stored in the memory device 153. The interface device 155 is used as an interface for being connected to the network.

The display device 156 displays a Graphical User Interface (GUI) using a program. The input device 157 is a keyboard, a mouse, a button, or a touch panel, and is used to input various operation instructions. In the SLG and the controller 100, when only remote control is performed, the input device 157 and the display device 156 may not be provided.

Effects of Embodiment

It is possible to efficiently use resources while satisfying the service requirement in the E2E slice including the plurality of subslices by the technology described in the present embodiment.

Due to the technology described in the present embodiment, the margins measured within each infrastructure provider are shared among the providers to satisfy the service requirement (for example, a delay of 50 ms) in the E2E. As a result, the margin is interchangeable in the E2E slice, and the optimal target value and QoS class can be configured in the E2E.

Figure 20:
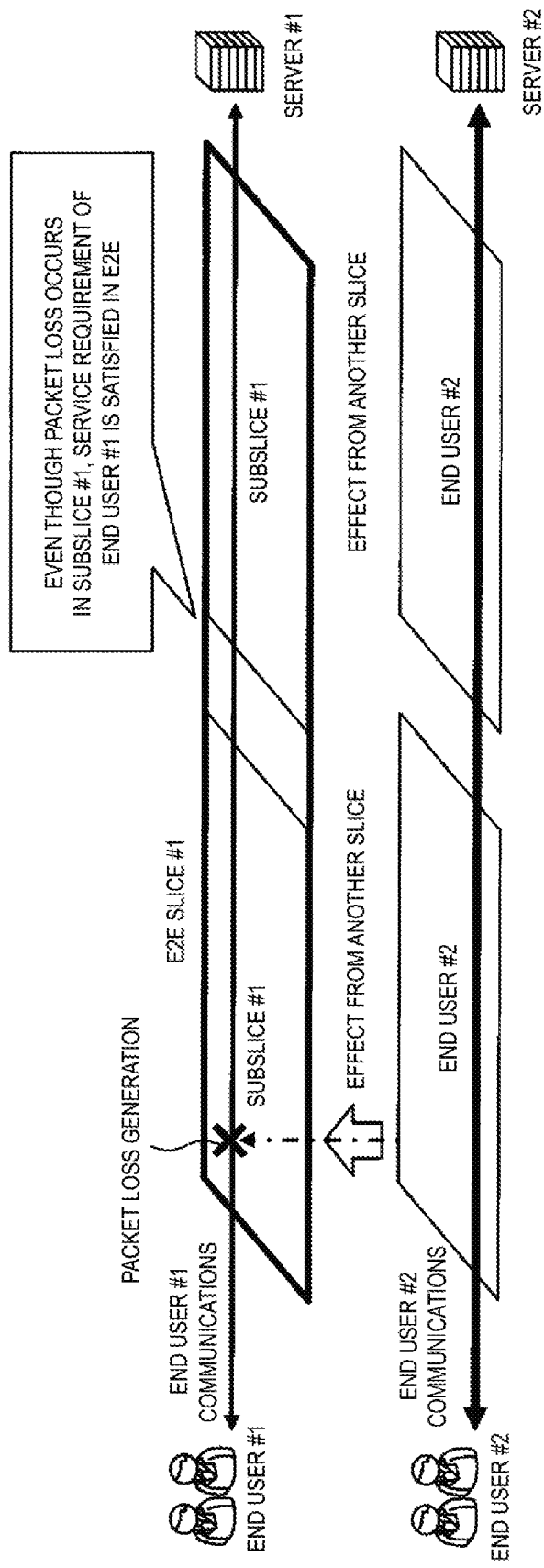
FIG. 20 is a diagram for describing effects.

As illustrated in FIG. 20, for example, even though the delay occurs in a specific subslice by the disturbance of another slice, the service requirement of an end user can be satisfied in real time by interchanging the margin in the E2E slice by using the technology according to the present disclosure.

Summary of Embodiment

As described above, according to the present embodiment, there is provided a communication system for controlling a slice including a plurality of subslices. The communication system includes four units.

A temporary configuration unit temporarily configures, for each subslice, a target value related to a service requirement.

A measurement unit acquires a measurement value related to the service requirement for each QoS class and measures a margin, with respect to the target value, of the measurement value, in each subslice.

A sharing unit shares the margin among the plurality of subslices.

An adjustment unit smooths the margin among the plurality of subslices while satisfying the service requirement for the slice and configures, for each subslice, the target value and the QoS class corresponding to the margin after smoothing.

The system that includes the controller 100 and the plurality of SLGs is an example of the communication system. The temporary configuration unit, the configuration unit 110, and the measurement unit N1 are examples of a temporary configuration unit and a measurement unit. The sharing unit N3 in the distributed control method is an example of a sharing unit, and the negotiation unit N4 and the control unit N5 are examples of an adjustment unit. The controller 100 in the centralized control method is an example of a sharing unit and an adjustment unit.

For example, the adjustment unit performs the smoothing such that the QoS class is obtained as low as possible in each subslice. When the target value configured by the temporary configuration unit is not achieved in any subslice, the adjustment unit may perform the smoothing.

After the target value and the QoS class are configured by the adjustment unit, the measurement by the measurement unit is continued. When the measurement value does not satisfy the target value, the target value and the QoS class may be reconfigured by the adjustment unit.

Although the present embodiment has been described, the present disclosure is not limited to such specific embodiment, and various modifications and changes are possible within the scope of the gist of the present disclosure described in the claims.

REFERENCE SIGNS LIST

11 to 61 measurement unit
12 to 62 determination unit
13 to 63 sharing unit
14 to 64 negotiation unit
15 to 65 control unit
100 controller
110 configuration unit
120 table
150 drive device
151 recording medium
152 auxiliary storage device
153 memory device
154 CPU
155 interface device
156 display device
157 input device

The invention claimed is:

1. A communication system for controlling a slice including a plurality of subslices, the system comprising:
a temporary configuration unit, including at least one processor and at least one memory device in data communication with the at least one processor, configured to temporarily configure, for each subslice, a target value related to a service requirement;
a measurement unit, including at least one processor and at least one memory device in data communication with the at least one processor, configured to acquire, in each subslice, a measurement value related to the service requirement for each Quality of Service (QoS) class and measure a margin, with respect to the target value, of the measurement value;
a sharing unit, including at least one processor and at least one memory device in data communication with the at least one processor, configured to share the margin among the plurality of subslices; and
an adjustment unit, including at least one processor and at least one memory device in data communication with the at least one processor, configured to smooth the margin among the plurality of subslices while satisfying the service requirement for the slice and configure, for each subslice, the target value and the QoS class corresponding to the margin after smoothing.

2. The communication system according to claim 1, wherein the adjustment unit performs the smoothing such that the QoS class is obtained as low as possible in each subslice.

3. The communication system according to claim 1, wherein the adjustment unit performs the smoothing when the target value configured by the temporary configuration unit is not achieved in any subslice.

4. The communication system according to claim 1, wherein measurement by the measurement unit is continued after configuring of the target value and the QoS class by the adjustment unit is performed, and when the measurement value does not satisfy the target value, the target value and the QoS class are reconfigured by the adjustment unit.

5. A slice control method executed by a communication system for controlling a slice including a plurality of subslices, the method comprising:
temporarily configuring, for each subslice, a target value related to a service requirement;
acquiring, in each subslice, a measurement value related to the service requirement for each Quality of Service (QoS) class and measuring a margin, with respect to the target value, of the measurement value;
sharing the margin among the plurality of subslices; and
smoothing the margin among the plurality of subslices while satisfying the service requirement for the slice, and configuring, for each subslice, the target value and the QoS class corresponding to the margin after smoothing.

6. The slice control method according to claim 5, wherein smoothing the margin comprises smoothing the margin such that the QoS class is obtained as low as possible in each subslice.

7. The slice control method according to claim 5, wherein smoothing the margin comprises smoothing when the target value is not achieved in any subslice.

\* \* \* \* \*